US011321365B1

(12) United States Patent
Nair et al.

(10) Patent No.: US 11,321,365 B1
(45) Date of Patent: May 3, 2022

(54) SEGMENT ACTIVATION ON RELATED ENTITIES

(71) Applicant: salesforce.com, inc., San Francisco, CA (US)

(72) Inventors: Vineeth Anand Nair, Mountain House, CA (US); Ashok Shivarudraiah, Fremont, CA (US); Lakshmi Srinivas Parimi, San Jose, CA (US); Matthew Westover, San Francisco, CA (US); Jamin Hall, Suwanee, GA (US); Sarah Flamion, Newburgh, IN (US); Aaron Popelka, San Francisco, CA (US); David Kriebel, Indianapolis, IN (US); Narender Ramasahayam, San Francisco, CA (US); Mitchell Loudenbeck, Indianapolis, IN (US); Praveen Savur, Santa Clara, CA (US); Sumit Garg, Summamish, WA (US); Kasia Fichtner, Moraga, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 17/156,213

(22) Filed: Jan. 22, 2021

Related U.S. Application Data

(60) Provisional application No. 63/093,664, filed on Oct. 19, 2020.

(51) Int. Cl.
*G06F 16/00* (2019.01)
*G06F 16/28* (2019.01)
*G06F 3/0482* (2013.01)

(52) U.S. Cl.
CPC .......... *G06F 16/288* (2019.01); *G06F 3/0482* (2013.01); *G06F 16/285* (2019.01)

(58) Field of Classification Search
CPC ........ G06F 16/185; G06F 16/20; G06F 16/28; G06F 16/282; G06F 16/289; G06F 16/288
See application file for complete search history.

(56) References Cited

U.S. PATENT DOCUMENTS

| 7,779,039 B2 * | 8/2010 | Weissman | G06F 16/284 707/793 |
| 7,921,299 B1 * | 4/2011 | Anantha | H04N 21/25875 726/28 |

(Continued)

OTHER PUBLICATIONS

Krebs; Rouven et al., "Architectural Concerns in Multi-Tenant SaaS Applications," Proceedings of the 2nd International Conference on Cloud Computing and Service Science, Apr. 18, 2012, pp. 2-3.

(Continued)

*Primary Examiner* — Cheryl Lewis
(74) *Attorney, Agent, or Firm* — Holland & Hart LLP

(57) ABSTRACT

A method for data processing includes identifying, for communication of a content object, a segment of entities including entities of a first entity class of a plurality of entity classes defined by a data model that is configured for a tenant of a multi-tenant system, where the data model defines relationships between entity classes of the plurality of entity classes. The method may further include activating for selection at a user interface at least one second entity class that is related to the first entity class based on the relationships and identifying a set of additional entities of the second entity class from the remaining entities that are related to the segment of entities as defined by the data model. The method may include transmitting to a content communication system an indication of the plurality of entity identifiers corresponding to a modified segment of entities that includes the additional entities.

20 Claims, 10 Drawing Sheets

(56) References Cited

U.S. PATENT DOCUMENTS

| | | | |
|---|---|---|---|
| 10,044,723 B1* | 8/2018 | Fischer | H04L 63/102 |
| 2006/0235831 A1* | 10/2006 | Adinolfi | G06Q 40/00 |
| 2019/0095395 A1 | 3/2019 | Piecko | |
| 2019/0163802 A1* | 5/2019 | MacLean | G06F 16/27 |
| 2020/0252470 A1 | 8/2020 | Gagnon-Kvale | |

OTHER PUBLICATIONS

Ren; Ming et al., "An Evolving Information System Based on Data Mining Knowledge to Support Customer Relationship Management," Advanced Management of Information for Globalized Enterprises, Sep. 28, 2008, pp. 1-5, IEEE, Piscataway, New Jersey, USA.

* cited by examiner

SEGMENT ACTIVATION ON RELATED ENTITIES

CROSS-REFERENCE

The present Application for Patent claims the benefit of U.S. Provisional Patent Application No. 63/093,664 by Nair et al., entitled "ENTITY SEGMENT EXTENSION BASED ON RELATIONSHIPS," filed Oct. 19, 2020, assigned to the assignee hereof, and expressly incorporated by reference herein.

FIELD OF TECHNOLOGY

The present disclosure relates generally to database systems and data processing, and more specifically to segment activation on related entities.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

A cloud platform may support content distribution to users. In some cases, the cloud platform may support a service that supports segmenting users into groups based on profiles and other attributes. These segments may be used for marketing purposes, such as content distribution, to a particular set of a target users having some attribute similarities.

DETAILED DESCRIPTION

Figure 1:
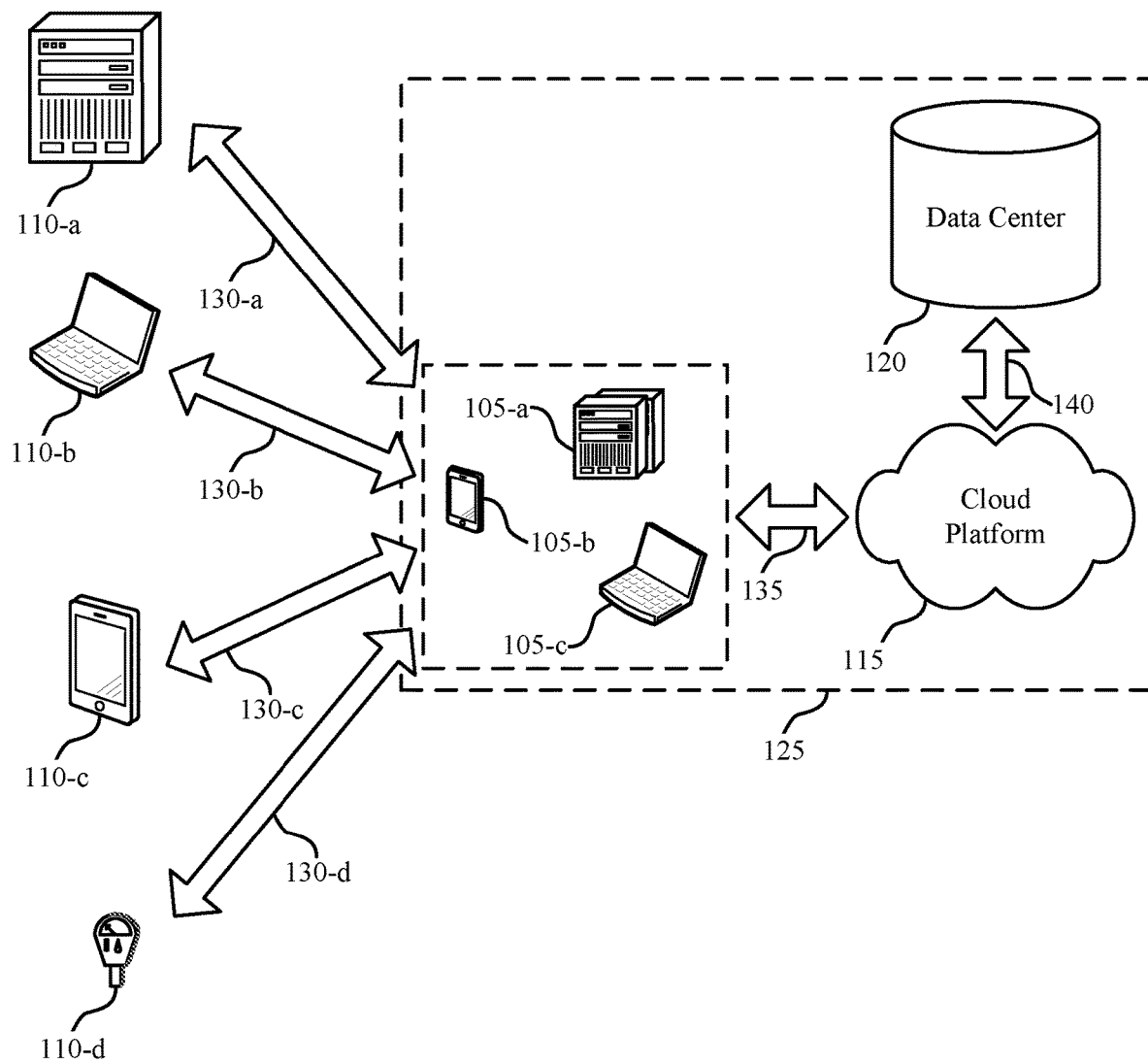
FIG. 1 illustrates an example of a data processing system that supports segment activation on related entities in accordance with aspects of the present disclosure.

In some examples, a cloud platform may support a customer data platform. A customer data platform may include one or more applications or services and may support functionality to ingest data from multiple sources, parse and analyze the data to define and build segments of users or entities based on attributes and profile data. These attributes may be inferred or may be explicit attributes, such as age, gender, interests, spending habits, browsing history, etc. The customer data platform may utilize these attributes to categorize or identify segments of related entities. In some examples, these segments of associated entities may be used for content distribution, such as for distribution of marketing content of a marketing campaign.

In some examples, the customer data platform may support a plurality of different tenants or organizations. Each tenant may be configured with a separate data model defining attributes and entities. In some examples, a data model may define relationships between a set of entities, where different entities may correspond to different individual users, a set of users, etc. For example, a tenant may define that a subset of entities or users correspond to the same household. That is, a household identifier that corresponds to a household entity may be associated with a set of child entities that are associated with the individual members of the households. Other relationships may include entities that are members of the same organization (e.g., employees at the organization), same team, entities that correspond to the same person, etc. For example, one entity identifier may correspond to a user that is browsing or interacting with a service via a mobile device, and another entity identifier may correspond to the same user that is browsing or interacting with the service using a desktop or laptop. Further, a unified individual entity may function as a parent entity of the individual entities that correspond to the user that accesses services using a different client (e.g., mobile device and desktop). Different techniques may be used to identify related entities, but the data model associated with the specific tenant may define the relationships.

Techniques described herein may be utilized for segment extension for identifying entities that are to receive a content item. The customer data platform may be configured to identify a segment of entities of a plurality of entities based on the attributes associated the entities. For example, a user may select an entity class and one or more attributes via a user interface, and the customer data platform may identify a segment of entities of the selected entity class based on the selected one or more attributes (based on similar or overlapping attributes). In some examples, the selected entity class may correspond to an individual or a unified set or grouping of entities (e.g., an organization or household). Via the user interface, a user may then indicate that the content item is to be distributed to a set of additional entities that are related to one or more entities of the identified segment based on the predefined relationships of the data model associated with the particular tenant. In some examples, the user may select the relationship, and the system may identify the entities of an entity population that are related to the entities of the segment according to the selected relationship.

As such, rather than creating different segments based on the individual entities of a known relationship (which may be resource intensive), predefined relationships of a data model may be used in association with a segment that is identified for one of the entities to extend the segment to other entities. For example, a content item may be created for distribution to a plurality of users. A segment of entities that correspond to a household may be generated based on a selected household entity. A user may wish to distribute the content item to each member of the household that are related to the entities of the segments. Thus, using the techniques described herein, the user may select the relationship and the system may identify additional entities related to the entities of the segment according to the selected relationship. Thus, this technique may reduce processing and memory overhead associated with generating multiple segments to identify the additional entities while supporting greater flexibility in segment generation and content distribution.

Aspects of the disclosure are initially described in the context of an environment supporting an on-demand database service. Aspects of the disclosure are further described with respect to a system diagram for segmentation and activation, a system diagram for segmentation, and a process flow diagram. Aspects of the disclosure are further illustrated by and described with reference to apparatus diagrams, system diagrams, and flowcharts that relate to segment activation on related entities.

FIG. 1 illustrates an example of a system 100 for cloud computing that supports segment activation on related entities in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The cloud platform 115 may support a segmentation application accessible at one or more of the cloud clients 105. The segmentation application may be utilized to identify segments of entity identifiers based on attributes associated with entities identifiers. A user of a cloud client 105 may utilize the application to identify a segment of entities that are to receive a content item (e.g., marketing content).

Some systems may identify segments of user identifiers based on attributes associated with the user identifiers. However, if a user wanted to create a grouping of user identifiers and a grouping related users, the user would need to leverage the system to create a first segment and then create a second based on the related user identifier that is related to the first user identifier. Generating segments of user identifiers using attributes may be resource intensive (e.g., may utilize significant processing resources), and as such, generating additional segments for related entities may increase the resource overhead.

Aspects of the present disclosure support a customer data platform (e.g., implemented in cloud platform 115) that supports different data models for various tenants of a multi-tenant system. Each tenant may use a data model that defines entities, attributes, and relationships between the entities and attributes. The customer data platform supports segmentation of entities based on these attributes and leveraging the data model to identify additional entities related to entities of the segment for content distribution flexibility. These techniques may reduce processing overhead, since the relationships are used to identify the additional entities rather than needing to generate separate segments for each entity type of the relationship. For example, a segment may be identified based on an entity, and then the relationships between the entities within the segment and entities that are not included in the segment may be used to identify other entities that may be recipients of a content object.

After a segment is identified using the techniques described herein, the system may activate a set of entity classes that may be selected by the user for identification of the additional entities. For example, the data model for a particular tenant may define that a first entity class (e.g., a household entity class) may be related to other individual entities (e.g., an individual entity class). Thus, if the segment is generated based on a household entity or includes entities that are household entities, then the system may activate the individual entity class for selection by a user. If the user selects the individual entity class, then the system may identify entities that are related to one or more of the entities of the segment based on this relationship as defined in the data model. Entity identifiers associated with the individual entities may be transmitted to or used by a content distribution system for distribution of content, such as marketing content.

It should be appreciated by a person skilled in the art that one or more aspects of the disclosure may be implemented in a system 100 to additionally or alternatively solve other problems than those described herein. Further, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

In one example utilization of the techniques described herein, a user may want to distribute a content item to a user within certain organization having particular attributes. As such, the user may create a segment of entities based on one entity that has one or more of the particular attributes. Thus, the resultant segment may include identifiers that correspond to organizations that are related to the selected organization. Each entity identifier may be associated with a set of child identifiers that correspond to employees of the organization. However, the user may not want to send the content item to each employee. As such, the user may select that the content item is to be "activated" to a "child entity" of the organization entity identifiers. These child entities may be predefined in a data model for a tenant. The set of child entity identifiers associated with the segment of organization entities may be transmitted to a content distribution platform for distribution of the content.

Figure 2:
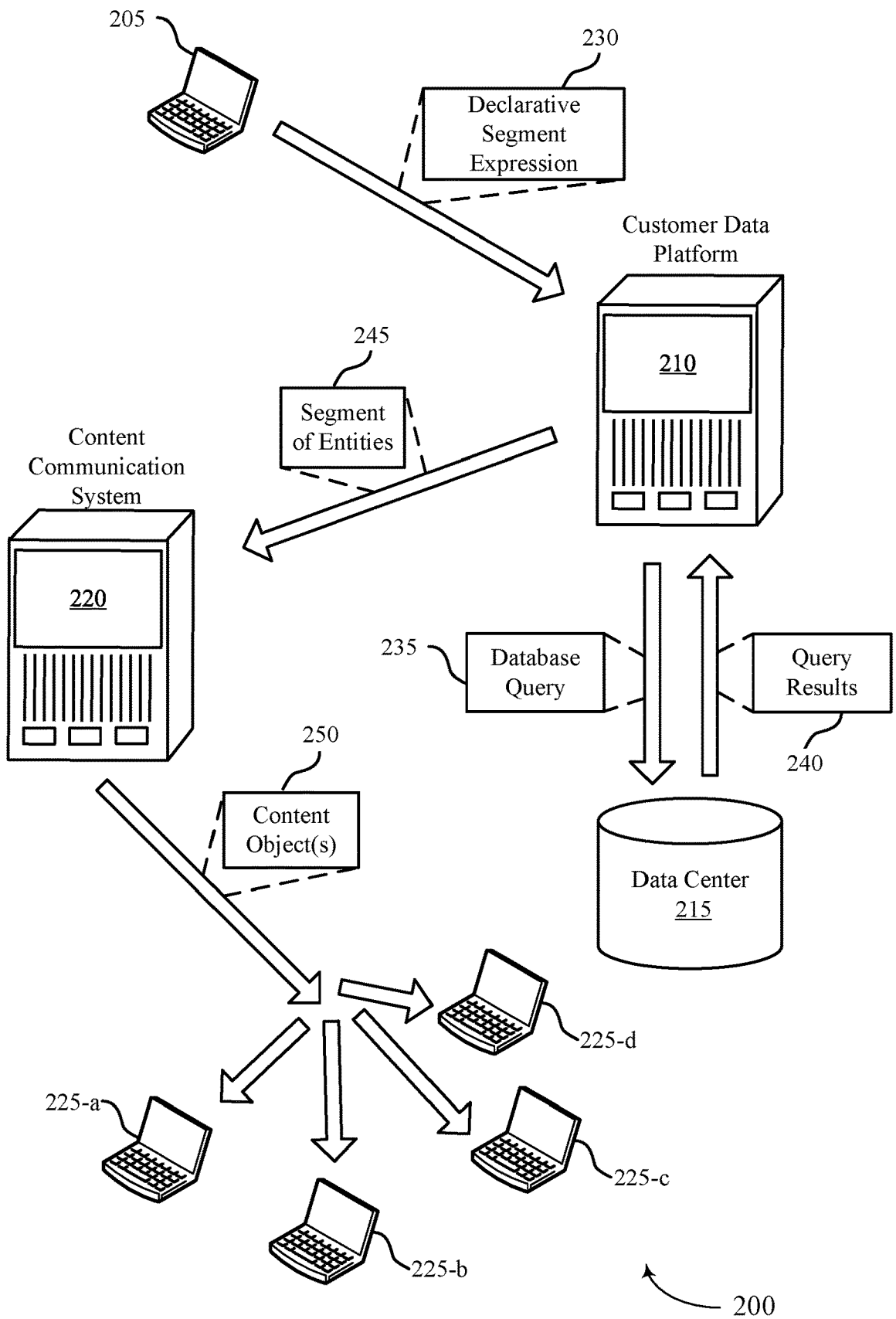
FIG. 2 illustrates an example of a system that supports segment activation on related entities in accordance with aspects of the present disclosure.

FIG. 2 illustrates an example of a system 200 that supports segment activation on related entities in accordance with aspects of the present disclosure. The system 200 includes a customer data platform 210 and a content communication system 220. The customer data platform 210 and/or the content communication system 220 may be implemented in various computing systems, such as one or more servers as described with respect to cloud platform 115 of FIG. 1. More particularly, the cloud platform 115 may include various computing systems that support various services, such as the customer data platform 210 and the content communication system 220. In some examples, the customer data platform 210 and the content communication system 220 may be implemented in the same physical and/or logical computing systems. In some cases, the content communication system 220 may be a service supported by the customer data platform 210 or some other similar platform or service.

The customer data platform 210 may support various services, including, and without limitation, an entity segmentation service. As described with respect to FIG. 1, the entity segmentation service may be configured to support a plurality of tenants (e.g., cloud clients 105). Each tenant may be configured with a respective data model that is stored in and managed by aspects of data center 215, which may be an example of a data center 120 of FIG. 1. Each data model may include a plurality of entities that are associated with respective entity identifiers. The entities may be associated with one or more users (e.g., a contact 110 of FIG. 1), which may be an example of customers, prospective customers, a team, a group of users, or the like. Each entity identifier may be associated with various attributes defined by the data model. The attributes may correspond to various characteristics, such as purchase history, web-behavior data, user characteristics (e.g., name, address, email address, age, gender, geographic location), among other attributes. The customer data platform 210 may monitor and augment the data model based on various user behaviors. For example, when a user purchases a product/service using a platform (e.g., an online store) supported by a tenant, data associated with the purchase may be augmented to the data model, and more particularly, to one or more entity identifiers associated with the user.

The data model may define various attributes that may be associated with entities, and the available attributes may be defined in association with entity type or entity class by the data model. In some examples, the entity is associated with a client (e.g., a client device, application, or the like) that the user utilizes to access various services. As such, each user may be associated with a plurality of entity identifiers. For example, a user may be associated with a respective individual entity identifier (corresponding to an individual entity class) for a mobile device or mobile device application and a desktop. In some cases, a user may be associated with an entity identifier for the user in a physical store. Further, the model for each tenant may define the respective relationships between entities. For example, each individual entity identifier (e.g., corresponding to the user in a store, using a mobile device, and using a desktop) may be associated with a unified entity (a unified individual entity class) with a respective identifier. Thus, this unified entity may be a "parent entity" or may have a parent relationship with each individual entity corresponding to the user for the respective clients or at a physical store. As such, each individual entity may be a "child entity" or have a child relationship with the unified entity. The customer data platform 210 may support a technique or service that identifies individual entities that correspond to the same user.

Other types of relationships may also be defined by the data model for a particular tenant. In some examples, the relationships between entity classes may be hierarchical relationships. For example, a set of individual entities or unified individual entities may be associated with a group entity (e.g., a group entity class). In one example, the group entity may be a household entity that corresponds to individuals of a household. In other example, a group entity may correspond to a team of individuals at an organization or firm. As such, the group entity may function as a parent entity of other entities. Similarly, group entities may also be associated with a parent entity. For example, an organizational or firm entity may be a parent entity of multiple group entities.

As discussed herein, the attributes that are available for the data model may vary for different tenants. Further, attributes may be associated with various sub-attributes or related attributes. For example, a purchase attribute may include sub-attributes that include the product name, price, date, and other product specifications. As described, the data model for the particular tenant may define these various types of relationships as well as the attributes. Further, the data model may maintain the relationships of various entities and the attributes that are associated with the entities. For example, database tables may maintain the entities, the attributes associated with the entities, sub-attributes, and other such information. Since some attributes may include sub attributes, a series of database tables may be configured for a data model. For example, a table may be configured for a purchase, and thus, multiple purchase tables may be associated with a particular entity, where each table includes information associated with a particular purchase. Other database configurations are contemplated within the scope of this disclosure.

The segmentation service supported by the customer data platform 210 may leverage the data model and the defined attributes and entity relationships for segment generation. In some cases, a marketing manager or another user (e.g., an employee of a tenant) may access the customer data platform for segment generation. A segment may be used for distribution of content (e.g., content objects). For example, the marketer may wish to identify a segment of the tenant subscribers or customers for marketing purposes. Rather, than sending content object to all subscribers or customers, the marketer may wish to define a segment of their subscribers for targeted marketing. For example, a user may utilize a user device 205, which may be an example of a device of a cloud client 105 or tenant, to access the segmentation service. The customer data platform 210 may support a user interface which the user may access to select an entity class, attributes, and the like for segment generation. For example, the user may select an entity class supported by the data model of the particular tenant. The selected entity class may be the basis for segment generation, meaning that the resultant segment may include entities of the selected entity class. After selection of the entity class, the segmentation service may display a set of selectable attributes for the selected entity class. The user may select one or more attributes, one or more operators, and other declarative components for generating a segment definition (e.g., a declarative segment expression 230). Based on the user selection of the attributes and other parameters, the customer data platform 210 may generate a database query 235 and execute the database query 235 on the database associated with the data model for the particular tenant. As described, the database may be managed by the data center 215, which may be integrated with or supported by the customer data platform 210.

In response to execution of the database query 235, a set of query results 240 may be surfaced. The query results 240 may correspond to a set of entity identifiers associated with entities that satisfy the declarative segment expression 230. For example, the declarative expression may correspond to "users that have spent more than $500 in the last year." In this example, the query results 240 may be list of entity identifiers (from the data model) that correspond to users that have spent more than $500 in the past year. Thus, this list of entity identifiers may be the identified segment of entities. It should be understood that many different types of attributes, values, and combinations of these may be used to define a segment.

After generating the segment of entities using the features supported by the customer data platform, the entity identifiers 245 corresponding to the segment of entities may be transmitted to or indicated to the content communication system 220. The content communication system 220 may support scheduling distribution, managing distribution, and the actual distribution of content objects 250 to user devices 225 that are associated with entities of the segment of entities 245. In some cases, a user may access the content communication system 220 for configuring a content object distribution schedule and frequency. The content communication system 220 may also monitor various feedback metrics associated with the distributed content object 250, such as click rate and open rate. These metrics may be further used to refine the content distribution schedule, among other features. The content communication system 220 may support distribution of the content object 250 using various channels, such as email, social media, search advertising, video advertising, mobile push, among other channels. Thus, the various identifiers or addresses for the various channels for users/entities may be maintained in association with the entities. In some cases, the distribution of content to the segment of entities may be referred to as segment activation.

Techniques described herein support activation to entities that are related to the identified segment of entities. After the segment of entities 245 is identified based on the declarative segment expression 230, for example, the customer data platform 210 may support identification of related entities using the data model for the particular tenant. Thus, after identification or selection of the segment, the segmentation service supported by the customer data platform 210 may activate one or more entity classes for selection by the user. The entity classes may be related to the entity class that is the basis of the segment according to the data model. For example, if the segment is generated based on a unified individual entity, meaning that the segment includes a set of unified individuals, then the system may activate and display a parent entity class (e.g., a group entity class, such as a household entity class) of the unified individual calls and/or a child entity class (e.g., individual entities) of the unified individual class for selection and activation.

This service provides for greater flexibility to a marketer. For example, the marketer may wish to generate a segment of unified individuals but may want to activate to (e.g., distribute content to) one or more of the various individual clients. Thus, rather than generating multiple segments, the techniques described herein leverage the relationships defined in a data model for efficient entity identification. As another example, the marketer may generate a segment of household entities based on common attributes among the households. Rather than activating to the household entities, the marketer may select to activate to one or more of the unified individuals of the household.

After selection of the entity class for activation, the customer data platform 210 may generate another database query 235, and the database query may be based on the selection of the entity class. Thus, if a user selects a parent entity class, then the query is generated that identifies the parent entities of the segment of entities as defined in the data model. Thus, for each entity of the base segment (e.g., the segment that is already generated according to the declarative segment expression 230 or a selection by the user), the system may identify one or more entities that have a parent relationship of the entity of the segment. Thus, the query results 240 may include a set of additional entities that are related to the segment of entities based on the selected relationship/entity class. The entity identifiers associated with at least the set of additional entities may be transmitted to or indicated to the content communication system 220 for distribution of the content object 250.

Figure 3:
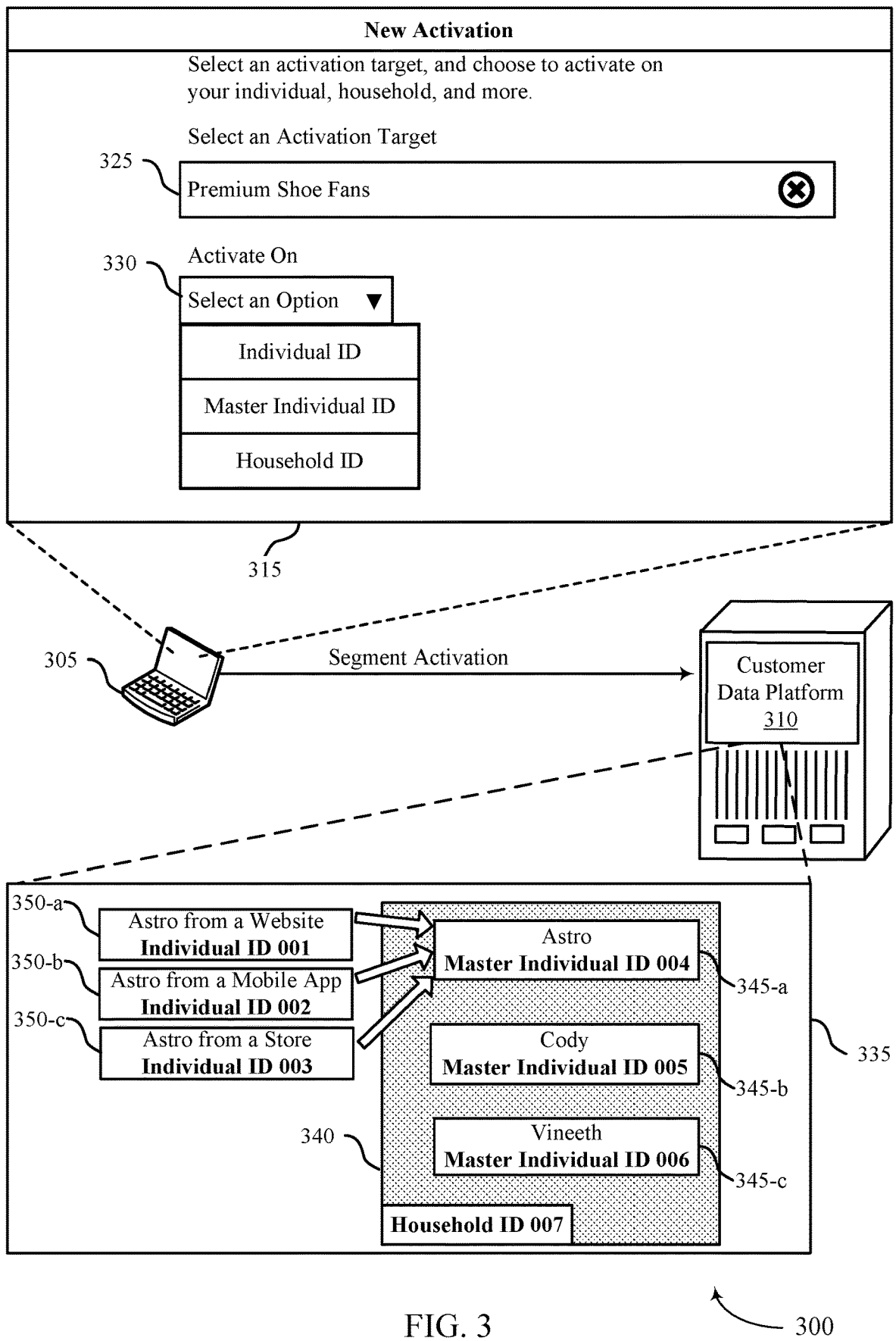
FIG. 3 illustrates an example of a system that supports segment activation on related entities in accordance with aspects of the present disclosure.

FIG. 3 illustrates an example of a system 300 that supports segment activation on related entities in accordance with aspects of the present disclosure. The system 300 includes a user device 305 and a customer data platform 310. The customer data platform 310 may be an example of the customer data platform 210 of FIG. 2. The customer data platform 310 may support various services for multiple tenants of a multi-tenant system. For example, the customer data platform 310 may support a segmentation service, as described with respect to FIG. 2. Further, the customer data platform 310 may maintain, manage, and augment data models for various tenants. Each data model include entities and attributes associated with the entities. The data models may be augmented based on various customer or subscriber behavior using platforms and services supported by the tenants. In some examples, the data model is augmented using data received from other parties, organizations, or services, such as search platform that monitors user search behavior.

The customer data platform 310 may support a user interface 315 that may be used for various services, such as segmentation and activation, and accessed via user device 305. In FIG. 3, the user interface 315 is illustrating a selection of an entity class for activation. At user interface component 325 a user may select a segment of entities. For example, as described with respect to FIG. 2, a user may utilize the customer data platform 310 to generate one or more segments. In some cases, a user may select an entity class and/or one or more attributes for segment generation. The customer data platform 310 may identify a set of entity identifiers that are associated with attributes such that the entities satisfy the declarative expression. For example, a user may create a segment called "Premium Shoe Fans," and the attributes may be selected such that each entity of the segment is associated with a user that has purchased at least one pair of shoes with a price greater than or equal to $200. Thus, the customer data platform 310 may identify a list of entity identifiers that satisfy the expression. The user may utilize the customer data platform 310 to generate multiple segments of various types. As such, the user may select one of the pre-defined segments for activation and an activation target at user interface component 325. An activation target may be an example of a delivery end-point or object that is created by a user. These endpoints may receive the segment of entities upon activation. These endpoints may correspond to business units or teams that schedule activations and communications (e.g., via content communication system 220 of FIG. 2).

Based on the segment selection the customer data platform 310 may activate a set of entity classes for selection at user interface component 330 of user interface 315. For example, the set of entity classes that are activated for selection may depend on the entity class that corresponds to the selected segment and the data model for the particular tenant. In the illustrated example, the data model may support an entity hierarchy as illustrated in data model portion 335. That is, the data model portion 335 illustrates an example portion of a data model for a particular tenant of the multi-tenant system. The data model for the tenant may define a household entity class (e.g., a group entity class) that may have one or more unified entities of the unified individual entity class that depend from (e.g., have a child relationship with) the household entity of the household entity class. Further, each unified individual entity class may have one or more individual entities of the individual entity class depending from (e.g., having a child relationship with) the individual entity class.

The data model portion 335 illustrates a household entity 340 of a household entity class. The household entity 340 is a parent entity of a set of unified individual entities 345 of the unified individual entity class. Each of the unified individual entities 345 may be a member of the same household. Further, each unified individual entity 345 may be a parent of one or more individual entities. For example, unified individual entity 345-a (e.g., corresponding to user "Astro") may be a parent of multiple individual entities 350. Individual entity 350-a may correspond to Astro that is accessing services supported by the tenant via a website; individual entity 350-b may correspond to user Astro that is accessing services supported by the tenant via a mobile application; and individual entity 350-c may correspond to user Astro that is accessing services supported by the tenant via a physical store (e.g., a physical store of the tenant or a store that shelves tenant products/services). Each entity illustrated in the data model portion 335 (and other entities of the data model) may be associated with respective entity identifiers and various attributes.

It should be understood that the data model may support various different types of relationships than those illustrated in the data model portion 335. In some examples, multiple group entities of a group entity class (e.g., a team entity, organization entity) may be child entities of another, higher layer, group entity. Further, multiple team entities may be child entities of an organization entity.

Thus, based on the data model and the segment selection, the customer data platform 310 may activate a set of entity classes for selection at user interface component 330. As illustrated in user interface 315, the entity classes, individual identifier, master individual identifier, or household identifier, are available for selection. If the premium shoe fans segment is generated based on and includes unified individual entities, then the user may select master individual identifier (e.g., unified individual) such that the activation of the segment includes those unified individual entities of the segment. If the user selects individual identifier, then the customer data platform 310 may generate a database query such that individual entity identifiers that are related to the unified individuals of the premium shoe fan segment are identified. Thus, if unified individual entity 345-a is a member of the premium shoe fan segment, and the user selects to activate the individual identifier, then the customer data platform 310 may identify individual entities 350-a, 350-b, and 350-c for additional entities. Similarly, if the user selects to activate on the household identifier, then the customer data platform 310 may identify household entity 340 as an additional entity based on the household entity 340 being related to the unified individual entity 345-a that is included in the segment.

In some cases, other relationships may be available for activation. For example, if the premium shoe fan segment includes a set of unified individual, such as unified individual entity 345-a, the user may select to activate to unified individuals of the same household (e.g., unified individual entities 345-b and 345-c of household entity 340). As another example, the segment may include individuals that may be members of a team according to the data model. The user may select to activate to each team such that each member of the team may be identified to receive a content object. After the user selects the entity class for activation, the customer data platform 310 may identify the additional entities that correspond to the segment of entities based on the relationships defined in the data model. These entity identifiers corresponding to the additional entities may be transmitted to a content communication system (e.g., content communication system 220 of FIG. 2) for distribution of content objects.

Further, in some cases, the user interface 315 may support further definition of the activatable entity. For example, if the segment of entities is generated using household entities, the user may select to activate to unified individuals of the household. However, rather than activating to each unified individual of the household, the user interface may display an additional user interface component that the user may use to further define the relationship type or attribute type of the unified individual. For example, the user may select to activate to the household owner or leader, account holder, etc. In another example, the user may select to activate to the children of the household, the mother, the father, etc. In yet another example, the user may select to activate to the female members of the household, male members of the household, members of the household greater than or less than an age, or the like. Based on these additional definitions, the system may identify the entity identifiers related to the entity identifiers of the segment according to the data model. Other activation definitions are contemplated within the scope of the present disclosure.

Figure 4:
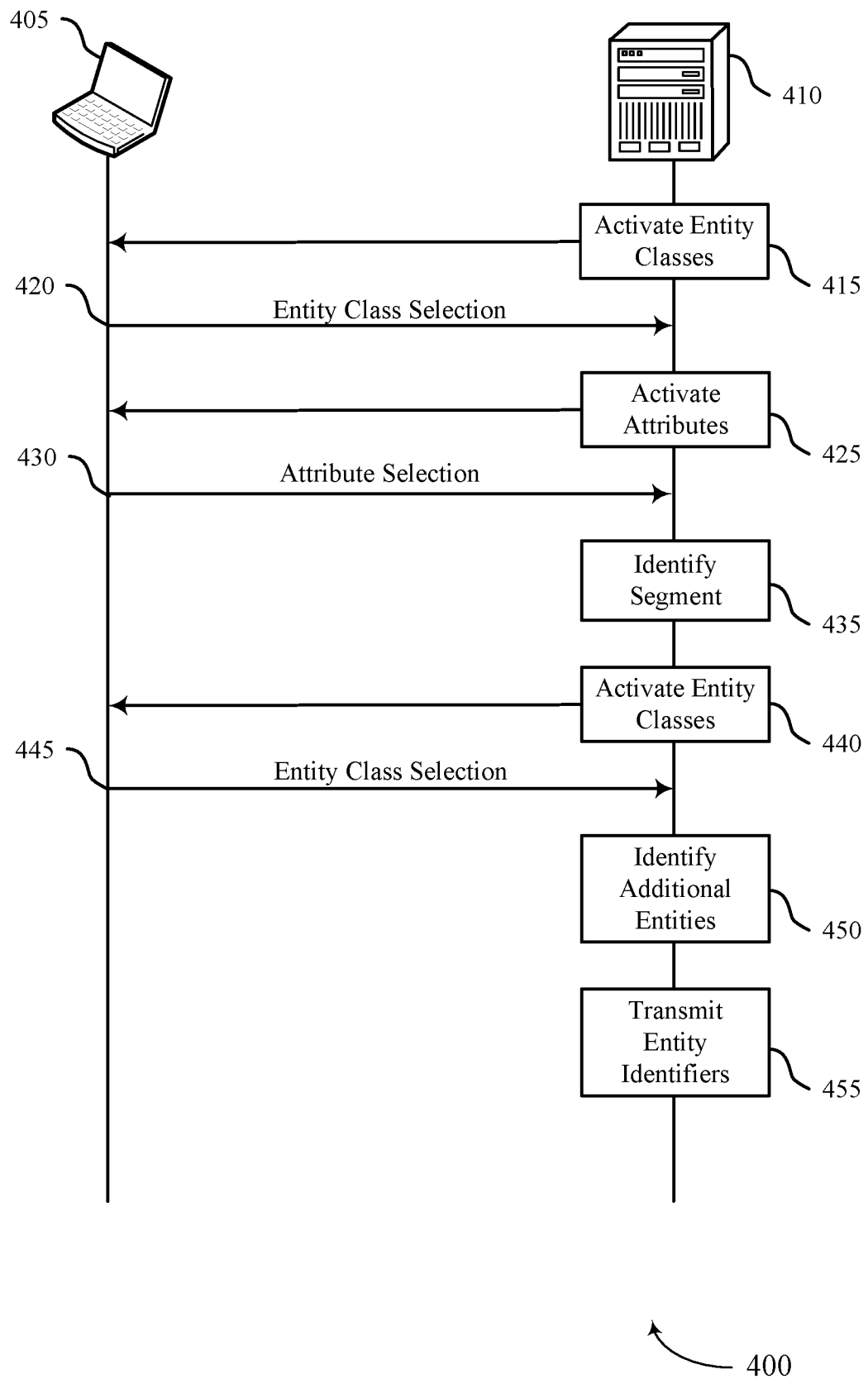
FIG. 4 illustrates an example of a process flow that supports segment activation on related entities in accordance with aspects of the present disclosure.

FIG. 4 illustrates an example of a process flow 400 that supports segment activation on related entities in accordance with aspects of the present disclosure. The process flow 400 may be implemented by a user device 405 and a server 410. The server 410 may be an example of or support a customer data platform 210 and 310 as described with respect to FIGS. 2 and 3. The user device 405 may be an example of a user device 205 and 305 as described with respect to FIGS. 2 and 3. A user may utilize user device 405 to access services, such as an entity segmentation service as described herein.

The user, using user device 405, may access the entity segmentation service. The service may support a user interface displayed at the user device 405. The user may be an employee (e.g., marketing manager) at tenant of a multi-tenant system supported by the server 410. The service may be accessed via a website or application at the user device 405. At 415, the server 410 may activate, for selection at the user interface, the plurality of entity classes based at least in part on a data model configured for a tenant. For example, the entity classes that the data model supports may be activated for selection. Activation may include causing the entity classes to be displayed at user device 405 for selection. Thus, activation may include transmitting a hypertext transfer protocol (HTTP) response to the user device 405 in response to a browser of the device navigating to the service. At 420, the server 410 may receive, via the user interface in response to activating the plurality of entity classes, a selection of the first entity class from the plurality of entity classes.

At 425, the server 410 may activate a set of attributes for selection at the user interface of the user device 405. The attributes may be activated based on the entity class selection and the data model. For example, the data model may support various attributes for different entity classes. Thus, those attributes that may be associated with the entity class that is selected may be activated for selection. At 430, the server 410, may receive via the user interface in response to activating the attributes, a selection of one or more attributes, one or more operators, etc. that define a declarative expression.

At 435, the server 410 may identify for communication of a content object, a segment of entities including entities of a first entity class of a plurality of entity classes defined by a data model configured for a tenant of a multi-tenant system. The segment may be identified based on a user selection of one or more attributes, operators, etc. of a declarative expression. In some examples, the user may select from one or more predefined segments. The data model may define one or more relationships between entity classes of the plurality of entity classes. For example, the data model may define that a group entity class may be a parent of various individual (e.g., individual or unified individual) entity classes, such that the individual entity classes may be considered child entities of the group entity class. The group entity class may correspond to a team, household, organization, or other groupings of individuals. Other relationships may be defined by the data model, as described herein.

At 440, the server 410, may activate for selection at the user interface, at least one second entity class that is related to the first entity class based at least in part on the one or more relationships. For example, if the identified segment of entities includes unified individuals, then the server 410 may activate the individual entity class, the unified individual entity class, or a group entity class (e.g., household entity class) for selection. That is, the selectable entity classes may be related to the entity class that defines the segment according to the data model.

At 445, the server 410 may receive via the user interface at the user device 405, an indication of a selection of a second entity class of the at least one second entity class. At 450, the server 410 may identify based at least in part on receiving the indication, a set of additional entities of the second entity class from remaining entities of a plurality of entities that are related to the segment of entities as defined by the data model. More particularly, the server may generate a database query. The database query may identify those entities that are related to entities of the segment according to the selected entity class and relationships defined in the data model. Thus, if the user selects a household entity for activation, the system may identify a household for each entity of the segment (or for those entities in the segment that are associated with a household entity).

At 455, the server 410 may transmit, to a content communication system for communication of the content object, an indication of a plurality of entity identifiers corresponding to a modified segment of entities that includes the set of additional entities. In some cases, only the identifiers corresponding to the set of additional entities are transmitted to the content communication system. In other examples, the identifiers corresponding to the set of additional entities and identifiers corresponding to the original base segment are transmitted to the content distribution system.

Figure 5:
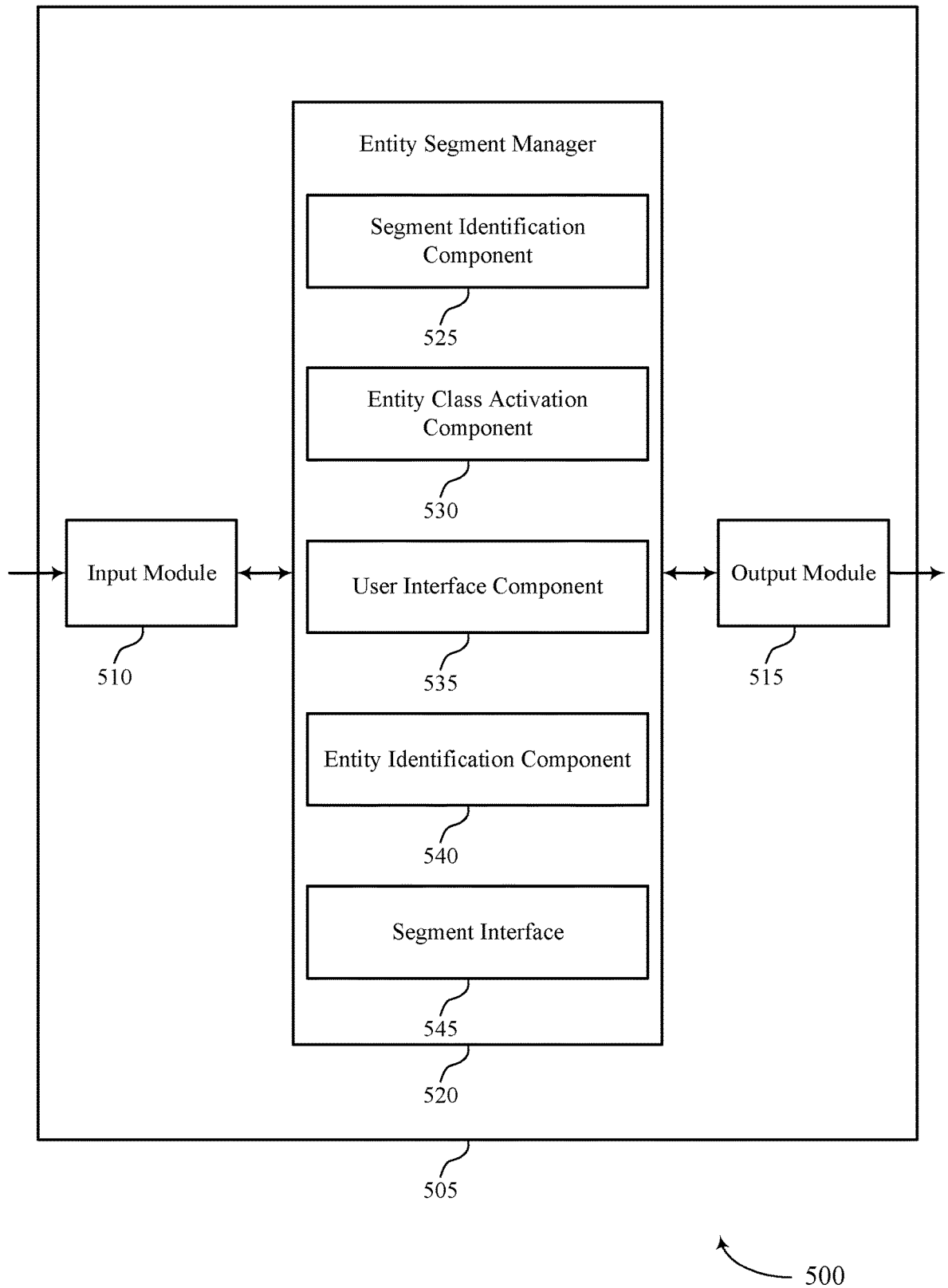
FIG. 5 shows a block diagram of an apparatus that supports segment activation on related entities in accordance with aspects of the present disclosure.

FIG. 5 shows a block diagram 500 of a device 505 that supports segment activation on related entities in accordance with aspects of the present disclosure. The device 505 may be an example of a server and may include an input module 510, an output module 515, and an entity segment manager 520. The device 505 may also include a processor. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the device 505 for processing. For example, the input module 510 may transmit input signals to the entity segment manager 720 to support segment activation on related entities. In some cases, the input module 510 may be a component of an I/O controller 710 as described with reference to FIG. 7.

The output module 515 may manage output signals for the device 505. For example, the output module 515 may receive signals from other components of the device 505, such as the entity segment manager 520, and may transmit these signals to other components or devices. In some specific examples, the output module 515 may transmit output signals for display in a user interface, for storage in a database or data store, for further processing at a server or server cluster, or for any other processes at any number of devices or systems. In some cases, the output module 515 may be a component of an I/O controller 710 as described with reference to FIG. 7.

For example, the entity segment manager 520 may include a segment identification component 525, an entity class activation component 530, a user interface component 535, an entity identification component 540, a segment interface 545, or any combination thereof. In some examples, the entity segment manager 520, or various components thereof, may be configured to perform various operations (e.g., receiving, monitoring, transmitting) using or otherwise in cooperation with the input module 510, the output module 515, or both. For example, the entity segment manager 520 may receive information from the input module 510, send information to the output module 515, or be integrated in combination with the input module 510, the output module 515, or both to receive information, transmit information, or perform various other operations as described herein.

The entity segment manager 520 may support data processing in accordance with examples as disclosed herein. The segment identification component 525 may be configured as or otherwise support a means for identifying, for communication of a content object, a segment of entities including entities of a first entity class of a plurality of entity classes defined by a data model configured for a tenant of a multi-tenant system, the data model defining one or more relationships between entity classes of the plurality of entity classes. The entity class activation component 530 may be configured as or otherwise support a means for activating, for selection at a user interface, at least one second entity class that is related to the first entity class based at least in part on the one or more relationships. The user interface component 535 may be configured as or otherwise support a means for receiving, via the user interface, an indication of a selection of a second entity class of the at least one second entity class. The entity identification component 540 may be configured as or otherwise support a means for identifying, based at least in part on receiving the indication, a set of additional entities of the second entity class from remaining entities of a plurality of entities that are related to the segment of entities as defined by the data model. The segment interface 545 may be configured as or otherwise support a means for transmitting, to a content communication system for communication of the content object, an indication of a plurality of entity identifiers corresponding to a modified segment of entities that includes the set of additional entities.

Figure 6:
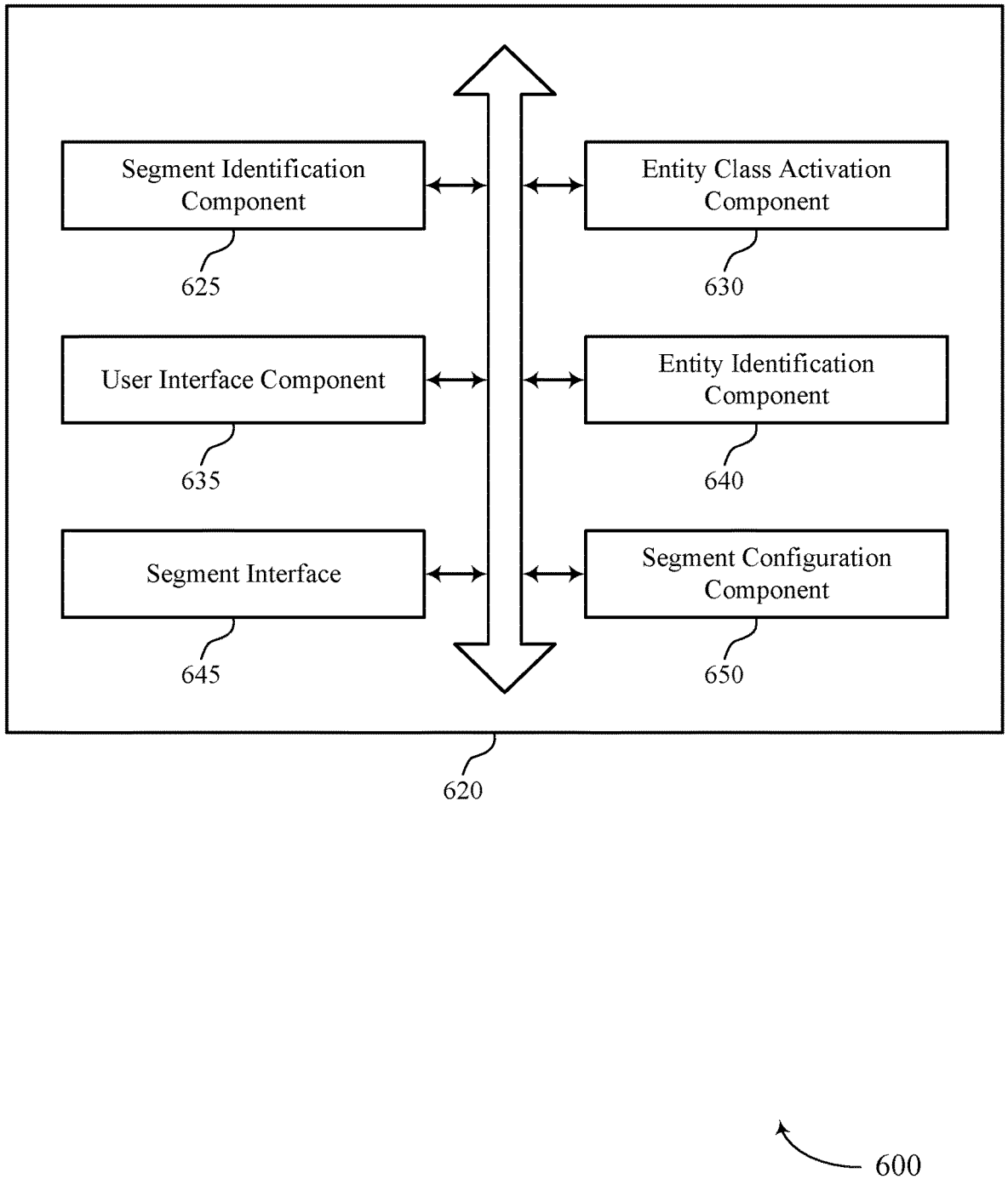
FIG. 6 shows a block diagram of an entity segment manager that supports segment activation on related entities in accordance with aspects of the present disclosure.

FIG. 6 shows a block diagram 600 of an entity segment manager 620 that supports segment activation on related entities in accordance with aspects of the present disclosure. The entity segment manager 620 may be an example of aspects of a server or an entity segment manager 520, or both, as described herein. The entity segment manager 620, or various components thereof, may be an example of means for performing various aspects of segment activation on related entities as described herein. For example, the entity segment manager 620 may include a segment identification component 625, an entity class activation component 630, a user interface component 635, an entity identification component 640, a segment interface 645, a segment configuration component 650, or any combination thereof. Each of these components may communicate, directly or indirectly, with one another (e.g., via one or more buses).

The entity segment manager 620 may support data processing in accordance with examples as disclosed herein. The segment identification component 625 may be configured as or otherwise support a means for identifying, for communication of a content object, a segment of entities including entities of a first entity class of a plurality of entity classes defined by a data model configured for a tenant of a multi-tenant system, the data model defining one or more relationships between entity classes of the plurality of entity classes. The entity class activation component 630 may be configured as or otherwise support a means for activating, for selection at a user interface, at least one second entity class that is related to the first entity class based at least in part on the one or more relationships. The user interface component 635 may be configured as or otherwise support a means for receiving, via the user interface, an indication of a selection of a second entity class of the at least one second entity class. The entity identification component 640 may be configured as or otherwise support a means for identifying, based at least in part on receiving the indication, a set of additional entities of the second entity class from remaining entities of a plurality of entities that are related to the segment of entities as defined by the data model. The segment interface 645 may be configured as or otherwise support a means for transmitting, to a content communication system for communication of the content object, an indication of a plurality of entity identifiers corresponding to a modified segment of entities that includes the set of additional entities.

In some examples, the segment configuration component 650 may be configured as or otherwise support a means for activating, for selection at the user interface, the plurality of entity classes based at least in part on the data model configured for the tenant. In some examples, the user interface component 635 may be configured as or otherwise support a means for receiving, via the user interface in response to activating the plurality of entity classes, a selection of the first entity class from the plurality of entity classes, wherein the segment of entities is identified based at least in part on the selection of the first entity class.

In some examples, to support identifying the set of additional entities, the entity identification component 640 may be configured as or otherwise support a means for identifying, for at least one entity of the segment of entities, an entity that is related to the at least one entity based at least in part on the one or more relationships and the selection of the second entity class.

In some examples, the set of additional entities comprises entities that are related to one or more entities of the segment of entities based at least in part on a parent relationship, a child relationship, a horizontal relationship, or another hierarchical relationship.

In some examples, to support identifying the set of additional entities, the entity identification component 640 may be configured as or otherwise support a means for identifying, for at least one entity of the segment of entities, a subset of the set of additional entities based at least in part on the subset being child entities of the at least one entity.

In some examples, the at least one entity and the child entities correspond to a same user. In some examples, the at least one entity is a group entity and each of the child entities correspond to a different user.

In some examples, to support identifying the set of additional entities, the entity identification component 640 may be configured as or otherwise support a means for identifying, for at least one entity of the segment of entities, an additional entity of the set of additional entities based at least in part on the additional entity being a parent entity of the at least one entity. In some examples, the additional entity and the parent entity correspond to a same user.

In some examples, to support transmitting, the indication of the plurality of entity identifiers, the segment interface 645 may be configured as or otherwise support a means for transmitting, to the content communication system for communication of the content object, the indication of the plurality of entity identifiers corresponding to the modified segment of entities that includes the set of additional entities and the segment of entities.

Figure 7:
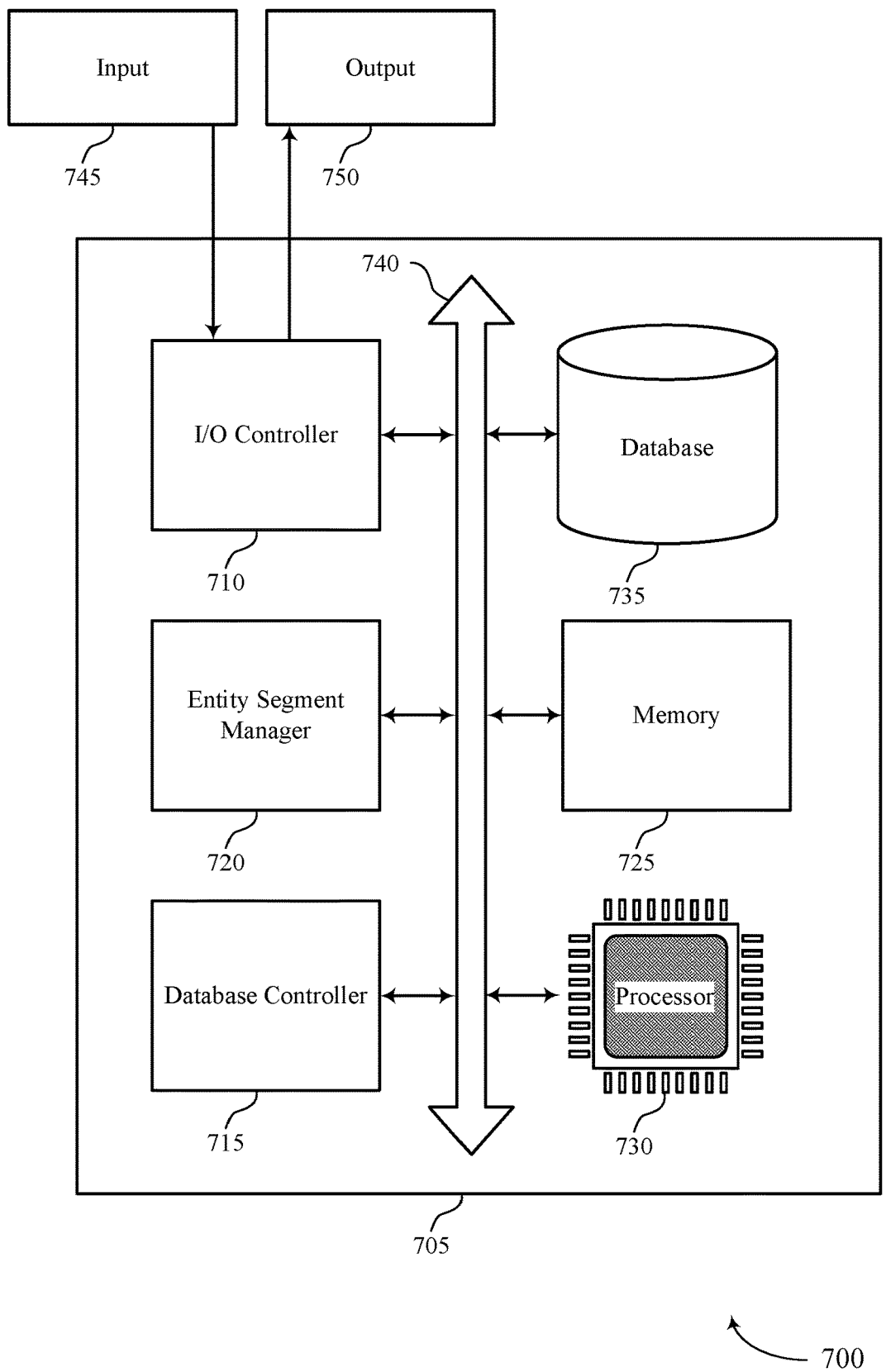
FIG. 7 shows a diagram of a system including a device that supports segment activation on related entities in accordance with aspects of the present disclosure.

FIG. 7 shows a diagram of a system 700 including a device 705 that supports segment activation on related entities in accordance with aspects of the present disclosure. The device 705 may be an example of or include the components of a device 505 as described herein. In some examples, aspects of the device 705 may be an example of a server, as described herein. The device 705 may include components for bi-directional data communications including components for transmitting and receiving communications, such as an entity segment manager 720, an I/O controller 710, a database controller 715, a memory 725, a processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor (e.g., processor 730). In some cases, a user may interact with the device 705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, a multi-tenant database, or an emergency backup database.

Memory 725 may include random-access memory (RAM) and read-only memory (ROM). The memory 725 may store computer-readable, computer-executable software including instructions that, when executed, cause the processor to perform various functions described herein. In some cases, the memory 725 may contain, among other things, a basic input/output system (BIOS) which may control basic hardware or software operation such as the interaction with peripheral components or devices.

The processor 730 may include an intelligent hardware device, (e.g., a general-purpose processor, a digital signal processor (DSP), a CPU, a microcontroller, an ASIC, a field programmable gate array (FPGA), a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting segment activation on related entities).

The entity segment manager 720 may support data processing in accordance with examples as disclosed herein. For example, the entity segment manager 720 may be configured as or otherwise support a means for identifying, for communication of a content object, a segment of entities including entities of a first entity class of a plurality of entity classes defined by a data model configured for a tenant of a multi-tenant system, the data model defining one or more relationships between entity classes of the plurality of entity classes. The entity segment manager 720 may be configured as or otherwise support a means for activating, for selection at a user interface, at least one second entity class that is related to the first entity class based at least in part on the one or more relationships. The entity segment manager 720 may be configured as or otherwise support a means for receiving, via the user interface, an indication of a selection of a second entity class of the at least one second entity class. The entity segment manager 720 may be configured as or otherwise support a means for identifying, based at least in part on receiving the indication, a set of additional entities of the second entity class from remaining entities of a plurality of entities that are related to the segment of entities as defined by the data model. The entity segment manager 720 may be configured as or otherwise support a means for transmitting, to a content communication system for communication of the content object, an indication of a plurality of entity identifiers corresponding to a modified segment of entities that includes the set of additional entities.

By including or configuring the entity segment manager 720 in accordance with examples as described herein, the device 705 may support techniques for reducing processing and memory overhead by supporting efficient entity identification based on relationships defined in the data mode. Thus, rather than identification of multiple segments for each member of the relationships, which may utilize significant processing and memory resources, the system may use the relationships to identify additional entities.

Figure 8:
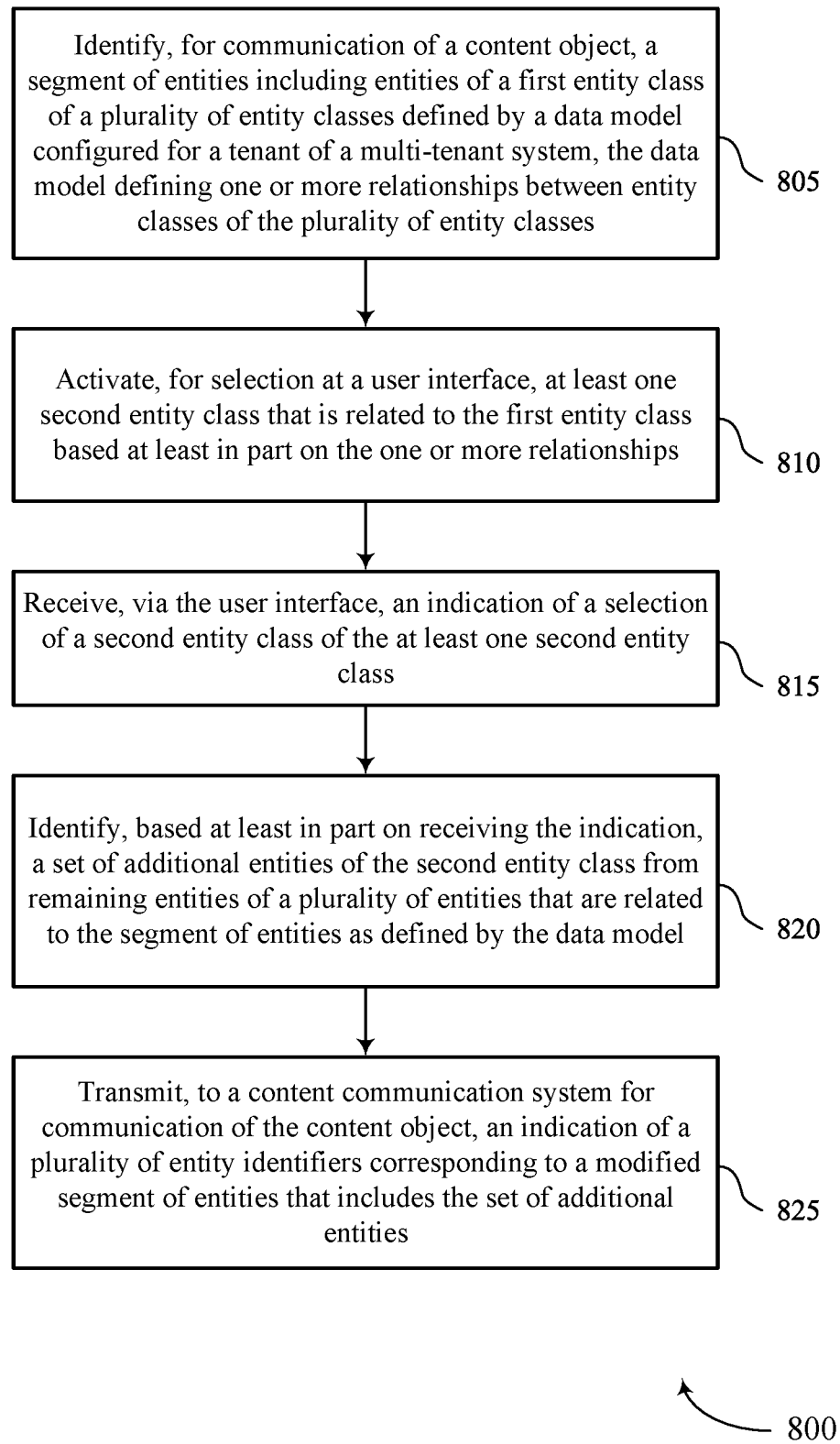
FIGS. 8 through 10 show flowcharts illustrating methods that support segment activation on related entities in accordance with aspects of the present disclosure.

FIG. 8 shows a flowchart illustrating a method 800 that supports segment activation on related entities in accordance with aspects of the present disclosure. The operations of the method 800 may be implemented by a server or its components as described herein. For example, the operations of the method 800 may be performed by a server or device as described with reference to FIG. 1 through 7. In some examples, a server may execute a set of instructions to control the functional elements of the server to perform the described functions. Additionally or alternatively, the server may perform aspects of the described functions using special-purpose hardware.

At 805, the method may include identifying, for communication of a content object, a segment of entities including entities of a first entity class of a plurality of entity classes defined by a data model configured for a tenant of a multi-tenant system, the data model defining one or more relationships between entity classes of the plurality of entity classes. The operations of 805 may be performed in accordance with examples as disclosed herein. In some examples, aspects of the operations of 805 may be performed by a segment identification component 625 as described with reference to FIG. 6.

At 810, the method may include activating, for selection at a user interface, at least one second entity class that is related to the first entity class based at least in part on the one or more relationships. The operations of 810 may be performed in accordance with examples as disclosed herein. In some examples, aspects of the operations of 810 may be performed by an entity class activation component 630 as described with reference to FIG. 6.

At 815, the method may include receiving, via the user interface, an indication of a selection of a second entity class of the at least one second entity class. The operations of 815 may be performed in accordance with examples as disclosed herein. In some examples, aspects of the operations of 815 may be performed by a user interface component 635 as described with reference to FIG. 6.

At 820, the method may include identifying, based at least in part on receiving the indication, a set of additional entities of the second entity class from remaining entities of a plurality of entities that are related to the segment of entities as defined by the data model. The operations of 820 may be performed in accordance with examples as disclosed herein. In some examples, aspects of the operations of 820 may be performed by an entity identification component 640 as described with reference to FIG. 6.

At 825, the method may include transmitting, to a content communication system for communication of the content object, an indication of a plurality of entity identifiers corresponding to a modified segment of entities that includes the set of additional entities. The operations of 825 may be performed in accordance with examples as disclosed herein. In some examples, aspects of the operations of 825 may be performed by a segment interface 645 as described with reference to FIG. 6.

Figure 9:
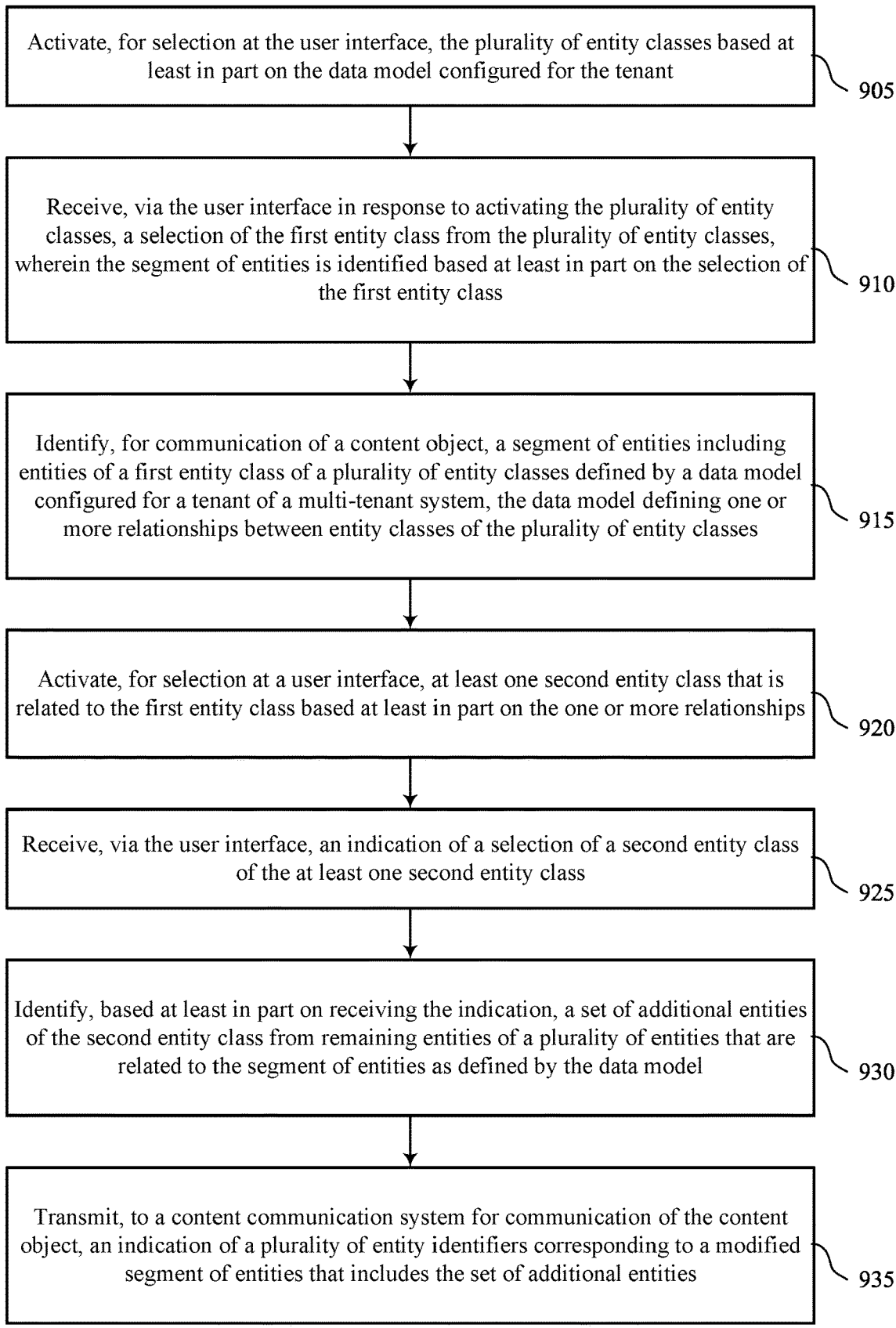

FIG. 9 shows a flowchart illustrating a method 900 that supports segment activation on related entities in accordance with aspects of the present disclosure. The operations of the method 900 may be implemented by a server or its components as described herein. For example, the operations of the method 900 may be performed by a server or device as described with reference to FIG. 1 through 7. In some examples, a server may execute a set of instructions to control the functional elements of the server to perform the described functions. Additionally or alternatively, the server may perform aspects of the described functions using special-purpose hardware.

At 905, the method may include activating, for selection at the user interface, the plurality of entity classes based at least in part on the data model configured for the tenant. The operations of 905 may be performed in accordance with examples as disclosed herein. In some examples, aspects of the operations of 905 may be performed by a segment configuration component 650 as described with reference to FIG. 6.

At 910, the method may include receiving, via the user interface in response to activating the plurality of entity classes, a selection of the first entity class from the plurality of entity classes, wherein the segment of entities is identified based at least in part on the selection of the first entity class. The operations of 910 may be performed in accordance with examples as disclosed herein. In some examples, aspects of the operations of 910 may be performed by a user interface component 635 as described with reference to FIG. 6.

At 915, the method may include identifying, for communication of a content object, a segment of entities including entities of a first entity class of a plurality of entity classes defined by a data model configured for a tenant of a multi-tenant system, the data model defining one or more relationships between entity classes of the plurality of entity classes. The operations of 915 may be performed in accordance with examples as disclosed herein. In some examples, aspects of the operations of 915 may be performed by a segment identification component 625 as described with reference to FIG. 6.

At 920, the method may include activating, for selection at a user interface, at least one second entity class that is related to the first entity class based at least in part on the one or more relationships. The operations of 920 may be performed in accordance with examples as disclosed herein. In some examples, aspects of the operations of 920 may be performed by an entity class activation component 630 as described with reference to FIG. 6.

At 925, the method may include receiving, via the user interface, an indication of a selection of a second entity class of the at least one second entity class. The operations of 925 may be performed in accordance with examples as disclosed herein. In some examples, aspects of the operations of 925 may be performed by a user interface component 635 as described with reference to FIG. 6.

At 930, the method may include identifying, based at least in part on receiving the indication, a set of additional entities of the second entity class from remaining entities of a plurality of entities that are related to the segment of entities as defined by the data model. The operations of 930 may be performed in accordance with examples as disclosed herein. In some examples, aspects of the operations of 930 may be performed by an entity identification component 640 as described with reference to FIG. 6.

At 935, the method may include transmitting, to a content communication system for communication of the content object, an indication of a plurality of entity identifiers corresponding to a modified segment of entities that includes the set of additional entities. The operations of 935 may be performed in accordance with examples as disclosed herein. In some examples, aspects of the operations of 935 may be performed by a segment interface 645 as described with reference to FIG. 6.

Figure 10:
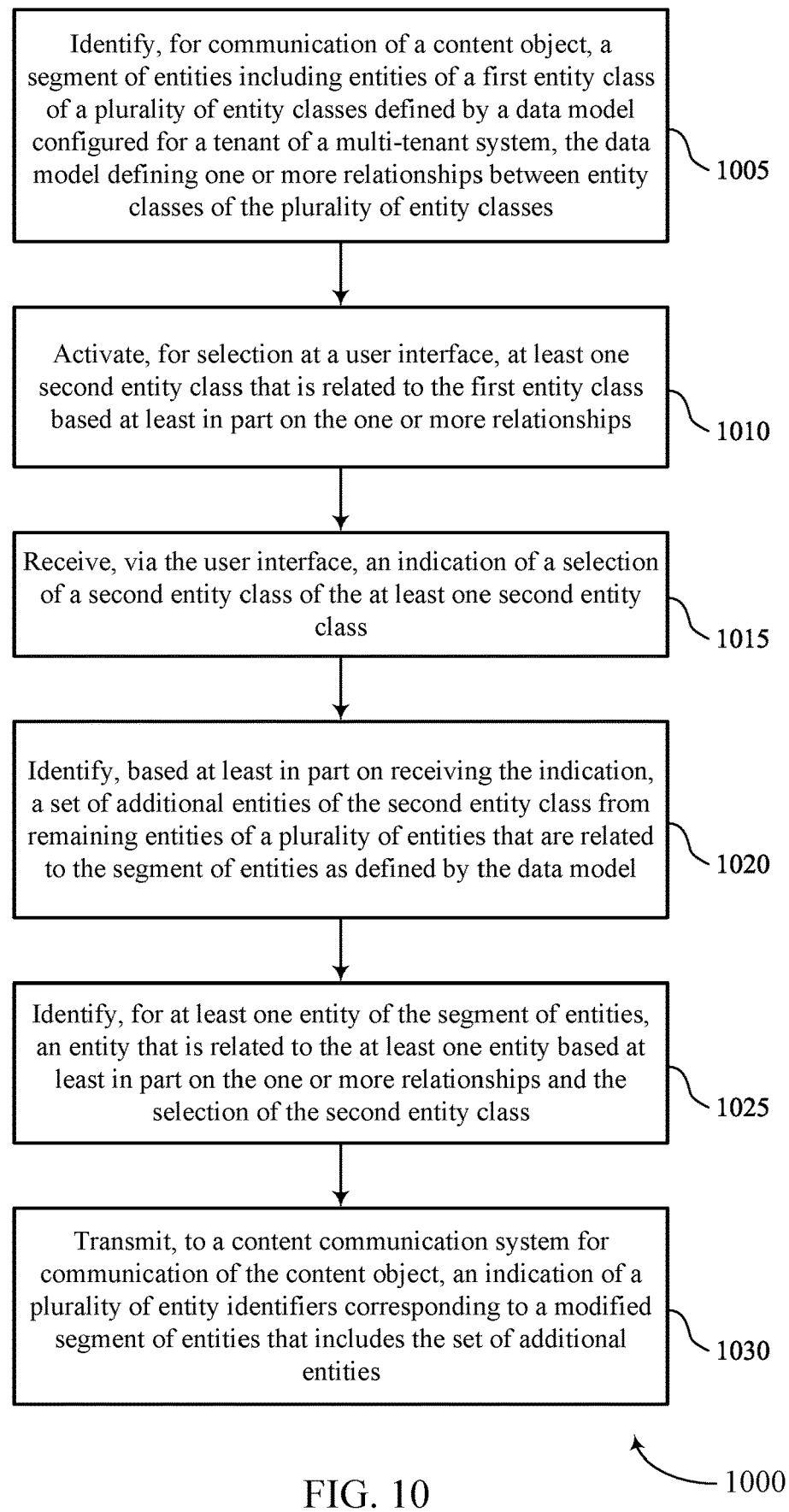

FIG. 10 shows a flowchart illustrating a method 1000 that supports segment activation on related entities in accordance with aspects of the present disclosure. The operations of the method 1000 may be implemented by a server or device or its components as described herein. For example, the operations of the method 1000 may be performed by a server or device as described with reference to FIG. 1 through 7. In some examples, a server may execute a set of instructions to control the functional elements of the server to perform the described functions. Additionally or alternatively, the server may perform aspects of the described functions using special-purpose hardware.

At 1005, the method may include identifying, for communication of a content object, a segment of entities including entities of a first entity class of a plurality of entity classes defined by a data model configured for a tenant of a multi-tenant system, the data model defining one or more relationships between entity classes of the plurality of entity classes. The operations of 1005 may be performed in accordance with examples as disclosed herein. In some examples, aspects of the operations of 1005 may be performed by a segment identification component 625 as described with reference to FIG. 6.

At 1010, the method may include activating, for selection at a user interface, at least one second entity class that is related to the first entity class based at least in part on the one or more relationships. The operations of 1010 may be performed in accordance with examples as disclosed herein. In some examples, aspects of the operations of 1010 may be performed by an entity class activation component 630 as described with reference to FIG. 6.

At 1015, the method may include receiving, via the user interface, an indication of a selection of a second entity class of the at least one second entity class. The operations of 1015 may be performed in accordance with examples as disclosed herein. In some examples, aspects of the operations of 1015 may be performed by a user interface component 635 as described with reference to FIG. 6.

At 1020, the method may include identifying, based at least in part on receiving the indication, a set of additional entities of the second entity class from remaining entities of a plurality of entities that are related to the segment of entities as defined by the data model. The operations of 1020 may be performed in accordance with examples as disclosed herein. In some examples, aspects of the operations of 1020 may be performed by an entity identification component 640 as described with reference to FIG. 6.

At 1025, the method may include identifying, for at least one entity of the segment of entities, an entity that is related to the at least one entity based at least in part on the one or more relationships and the selection of the second entity class. The operations of 1025 may be performed in accordance with examples as disclosed herein. In some examples, aspects of the operations of 1025 may be performed by an entity identification component 640 as described with reference to FIG. 6.

At 1030, the method may include transmitting, to a content communication system for communication of the content object, an indication of a plurality of entity identifiers corresponding to a modified segment of entities that includes the set of additional entities. The operations of 1030 may be performed in accordance with examples as disclosed herein. In some examples, aspects of the operations of 1030 may be performed by a segment interface 645 as described with reference to FIG. 6.

A method for data processing is described. The method may include identifying, for communication of a content object, a segment of entities including entities of a first entity class of a plurality of entity classes defined by a data model configured for a tenant of a multi-tenant system, the data model defining one or more relationships between entity classes of the plurality of entity classes, activating, for selection at a user interface, at least one second entity class that is related to the first entity class based at least in part on the one or more relationships, receiving, via the user interface, an indication of a selection of a second entity class of the at least one second entity class, identifying, based at least in part on receiving the indication, a set of additional entities of the second entity class from remaining entities of a plurality of entities that are related to the segment of entities as defined by the data model, and transmitting, to a content communication system for communication of the content object, an indication of a plurality of entity identifiers corresponding to a modified segment of entities that includes the set of additional entities.

An apparatus for data processing is described. The apparatus may include a processor, memory in electronic communication with the processor, and instructions stored in the memory. The instructions may be executable by the processor to cause the apparatus to identify, for communication of a content object, a segment of entities including entities of a first entity class of a plurality of entity classes defined by a data model configured for a tenant of a multi-tenant system, the data model defining one or more relationships between entity classes of the plurality of entity classes, activating, for selection at a user interface, at least one second entity class that is related to the first entity class based at least in part on the one or more relationships, receive, via the user interface, an indication of a selection of a second entity class of the at least one second entity class, identify, based at least in part on receiving the indication, a set of additional entities of the second entity class from remaining entities of a plurality of entities that are related to the segment of entities as defined by the data model, and transmit, to a content communication system for communication of the content object, an indication of a plurality of entity identifiers corresponding to a modified segment of entities that includes the set of additional entities.

Another apparatus for data processing is described. The apparatus may include means for identifying, for communication of a content object, a segment of entities including entities of a first entity class of a plurality of entity classes defined by a data model configured for a tenant of a multi-tenant system, the data model defining one or more relationships between entity classes of the plurality of entity classes, means for activating, for selection at a user interface, at least one second entity class that is related to the first entity class based at least in part on the one or more relationships, means for receiving, via the user interface, an indication of a selection of a second entity class of the at least one second entity class, means for identifying, based at least in part on receiving the indication, a set of additional entities of the second entity class from remaining entities of a plurality of entities that are related to the segment of entities as defined by the data model, and means for transmitting, to a content communication system for communication of the content object, an indication of a plurality of entity identifiers corresponding to a modified segment of entities that includes the set of additional entities.

A non-transitory computer-readable medium storing code for data processing is described. The code may include instructions executable by a processor to identify, for communication of a content object, a segment of entities including entities of a first entity class of a plurality of entity classes defined by a data model configured for a tenant of a multi-tenant system, the data model defining one or more relationships between entity classes of the plurality of entity classes, activating, for selection at a user interface, at least one second entity class that is related to the first entity class based at least in part on the one or more relationships, receive, via the user interface, an indication of a selection of a second entity class of the at least one second entity class, identify, based at least in part on receiving the indication, a set of additional entities of the second entity class from remaining entities of a plurality of entities that are related to the segment of entities as defined by the data model, and transmit, to a content communication system for communication of the content object, an indication of a plurality of entity identifiers corresponding to a modified segment of entities that includes the set of additional entities.

In some examples of the method, apparatuses, and non-transitory computer-readable medium described herein, activating, for selection at the user interface, the plurality of entity classes based at least in part on the data model configured for the tenant and receiving, via the user interface in response to activating the plurality of entity classes, a selection of the first entity class from the plurality of entity classes, wherein the segment of entities may be identified based at least in part on the selection of the first entity class.

In some examples of the method, apparatuses, and non-transitory computer-readable medium described herein, identifying the set of additional entities may include operations, features, means, or instructions for identifying, for at least one entity of the segment of entities, an entity that may be related to the at least one entity based at least in part on the one or more relationships and the selection of the second entity class.

In some examples of the method, apparatuses, and non-transitory computer-readable medium described herein, the set of additional entities comprises entities that may be related to one or more entities of the segment of entities based at least in part on a parent relationship, a child relationship, a horizontal relationship, or another hierarchical relationship.

In some examples of the method, apparatuses, and non-transitory computer-readable medium described herein, identifying the set of additional entities may include operations, features, means, or instructions for identifying, for at least one entity of the segment of entities, a subset of the set of additional entities based at least in part on the subset being child entities of the at least one entity.

In some examples of the method, apparatuses, and non-transitory computer-readable medium described herein, the at least one entity and the child entities correspond to a same user.

In some examples of the method, apparatuses, and non-transitory computer-readable medium described herein, the at least one entity may be a group entity and each of the child entities correspond to a different user.

In some examples of the method, apparatuses, and non-transitory computer-readable medium described herein, identifying the set of additional entities may include operations, features, means, or instructions for identifying, for at least one entity of the segment of entities, an additional entity of the set of additional entities based at least in part on the additional entity being a parent entity of the at least one entity.

In some examples of the method, apparatuses, and non-transitory computer-readable medium described herein, the additional entity and the parent entity correspond to a same user.

In some examples of the method, apparatuses, and non-transitory computer-readable medium described herein, transmitting, the indication of the plurality of entity identifiers may include operations, features, means, or instructions for transmitting, to the content communication system for communication of the content object, the indication of the plurality of entity identifiers corresponding to the modified segment of entities that includes the set of additional entities and the segment of entities.

It should be noted that the methods described herein describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:
   identifying, for communication of a content object, a segment of entities including entities of a first entity class of a plurality of entity classes defined by a data model configured for a tenant of a multi-tenant system, the data model defining one or more relationships between entity classes of the plurality of entity classes;
   activating, for selection at a user interface, at least one second entity class that is related to the first entity class based at least in part on the one or more relationships;
   receiving, via the user interface, an indication of a selection of a second entity class of the at least one second entity class;
   identifying, based at least in part on receiving the indication, a set of additional entities of the second entity class from remaining entities of a plurality of entities that are related to the segment of entities as defined by the data model; and
   transmitting, to a content communication system for communication of the content object, an indication of a plurality of entity identifiers corresponding to a modified segment of entities that includes the set of additional entities.

2. The method of claim 1, further comprising:
   activating, for selection at the user interface, the plurality of entity classes based at least in part on the data model configured for the tenant; and
   receiving, via the user interface in response to activating the plurality of entity classes, a selection of the first entity class from the plurality of entity classes, wherein the segment of entities is identified based at least in part on the selection of the first entity class.

3. The method of claim 1, wherein identifying the set of additional entities comprises:
   identifying, for at least one entity of the segment of entities, an entity that is related to the at least one entity based at least in part on the one or more relationships and the selection of the second entity class.

4. The method of claim 3, wherein the set of additional entities comprises entities that are related to one or more entities of the segment of entities based at least in part on a parent relationship, a child relationship, a horizontal relationship, or another hierarchical relationship.

5. The method of claim 1, wherein identifying the set of additional entities comprises:
   identifying, for at least one entity of the segment of entities, a subset of the set of additional entities based at least in part on the subset being child entities of the at least one entity.

6. The method of claim 5, wherein the at least one entity and the child entities correspond to a same user.

7. The method of claim 5, wherein the at least one entity is a group entity and each of the child entities correspond to a different user.

8. The method of claim 1, wherein identifying the set of additional entities comprises:
   identifying, for at least one entity of the segment of entities, an additional entity of the set of additional entities based at least in part on the additional entity being a parent entity of the at least one entity.

9. The method of claim 8, wherein the additional entity and the parent entity correspond to a same user.

10. The method of claim 1, wherein transmitting, the indication of the plurality of entity identifiers comprises:
    transmitting, to the content communication system for communication of the content object, the indication of the plurality of entity identifiers corresponding to the modified segment of entities that includes the set of additional entities and the segment of entities.

11. An apparatus for data processing, comprising:
    a processor;
    memory coupled with the processor; and
    instructions stored in the memory and executable by the processor to cause the apparatus to:
    identify, for communication of a content object, a segment of entities including entities of a first entity class of a plurality of entity classes defined by a data model configured for a tenant of a multi-tenant system, the data model defining one or more relationships between entity classes of the plurality of entity classes;

activate, for selection at a user interface, at least one second entity class that is related to the first entity class based at least in part on the one or more relationships;

receive, via the user interface, an indication of a selection of a second entity class of the at least one second entity class;

identify, based at least in part on receiving the indication, a set of additional entities of the second entity class from remaining entities of a plurality of entities that are related to the segment of entities as defined by the data model; and transmit, to a content communication system for communication of the content object, an indication of a plurality of entity identifiers corresponding to a modified segment of entities that includes the set of additional entities.

12. The apparatus of claim 11, wherein the instructions are further executable by the processor to cause the apparatus to:

activate, for selection at the user interface, the plurality of entity classes based at least in part on the data model configured for the tenant; and receive, via the user interface in response to activating the plurality of entity classes, a selection of the first entity class from the plurality of entity classes, wherein the segment of entities is identified based at least in part on the selection of the first entity class.

13. The apparatus of claim 11, wherein the instructions to identify the set of additional entities are executable by the processor to cause the apparatus to:

identify, for at least one entity of the segment of entities, an entity that is related to the at least one entity based at least in part on the one or more relationships and the selection of the second entity class.

14. The apparatus of claim 13, wherein the set of additional entities comprises entities that are related to one or more entities of the segment of entities based at least in part on a parent relationship, a child relationship, a horizontal relationship, or another hierarchical relationship.

15. The apparatus of claim 11, wherein the instructions to identify the set of additional entities are executable by the processor to cause the apparatus to:

identify, for at least one entity of the segment of entities, a subset of the set of additional entities based at least in part on the subset being child entities of the at least one entity.

16. A non-transitory computer-readable medium storing code for data processing, the code comprising instructions executable by a processor to:

identify, for communication of a content object, a segment of entities including entities of a first entity class of a plurality of entity classes defined by a data model configured for a tenant of a multi-tenant system, the data model defining one or more relationships between entity classes of the plurality of entity classes;

activate, for selection at a user interface, at least one second entity class that is related to the first entity class based at least in part on the one or more relationships;

receive, via the user interface, an indication of a selection of a second entity class of the at least one second entity class;

identify, based at least in part on receiving the indication, a set of additional entities of the second entity class from remaining entities of a plurality of entities that are related to the segment of entities as defined by the data model; and transmit, to a content communication system for communication of the content object, an indication of a plurality of entity identifiers corresponding to a modified segment of entities that includes the set of additional entities.

17. The non-transitory computer-readable medium of claim 16, wherein the instructions are further executable by the processor to:

activate, for selection at the user interface, the plurality of entity classes based at least in part on the data model configured for the tenant; and receive, via the user interface in response to activating the plurality of entity classes, a selection of the first entity class from the plurality of entity classes, wherein the segment of entities is identified based at least in part on the selection of the first entity class.

18. The non-transitory computer-readable medium of claim 16, wherein the instructions to identify the set of additional entities are executable by the processor to:

identify, for at least one entity of the segment of entities, an entity that is related to the at least one entity based at least in part on the one or more relationships and the selection of the second entity class.

19. The non-transitory computer-readable medium of claim 18, wherein the set of additional entities comprises entities that are related to one or more entities of the segment of entities based at least in part on a parent relationship, a child relationship, a horizontal relationship, or another hierarchical relationship.

20. The non-transitory computer-readable medium of claim 16, wherein the instructions to identify the set of additional entities are executable by the processor to:

identify, for at least one entity of the segment of entities, a subset of the set of additional entities based at least in part on the subset being child entities of the at least one entity.

* * * * *